United States Patent
Lee et al.

(10) Patent No.: US 11,172,392 B2
(45) Date of Patent: Nov. 9, 2021

(54) METHOD AND APPARATUS FOR DECLARING RLF

(71) Applicant: LG Electronics Inc., Seoul (KR)

(72) Inventors: Jaewook Lee, Seoul (KR); Hongsuk Kim, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/641,507

(22) PCT Filed: Oct. 8, 2018

(86) PCT No.: PCT/KR2018/011815
§ 371 (c)(1),
(2) Date: Feb. 24, 2020

(87) PCT Pub. No.: WO2019/070106
PCT Pub. Date: Apr. 11, 2019

(65) Prior Publication Data
US 2021/0136612 A1 May 6, 2021

Related U.S. Application Data

(60) Provisional application No. 62/569,414, filed on Oct. 6, 2017.

(51) Int. Cl.
*H04W 76/19* (2018.01)
*H04W 24/10* (2009.01)
*H04W 24/08* (2009.01)

(52) U.S. Cl.
CPC ........... *H04W 24/10* (2013.01); *H04W 24/08* (2013.01)

(58) Field of Classification Search
CPC .............................. H04W 76/18; H04W 76/19
See application file for complete search history.

(56) References Cited

U.S. PATENT DOCUMENTS

| | | | | |
|---|---|---|---|---|
| 2010/0113008 A1* | 5/2010 | Wang | ..................... | H04W 24/10 455/423 |
| 2013/0303214 A1* | 11/2013 | Ahmadi | ............ | H04W 72/1215 455/501 |
| 2015/0296526 A1* | 10/2015 | Behravan | .............. | H04W 24/02 370/329 |

(Continued)

FOREIGN PATENT DOCUMENTS

WO     WO2010105148     9/2010

OTHER PUBLICATIONS

AT&T, "Beam Failure Events and Criteria for Declaring Radio Link Failure", R2-1708205, 3GPP TSG-RAN WG2 #99, Berlin, Germany, Aug. 21-25, 2017, 4 pages.

(Continued)

*Primary Examiner* — Kevin Kim
(74) *Attorney, Agent, or Firm* — Fish & Richardson P.C.

(57) ABSTRACT

Provided is a method for declaring a radio link failure (RLF) by a radio resource control (RRC) layer of a user equipment (UE). The method may include: receiving information on failure of beam recovery, from a lower layer of the UE; receiving at least one out-of-sync (OOS) signal, from the lower layer of the UE; and when a number of OOS signals which is received after receiving the information on failure of beam recovery satisfies a threshold value, declaring the RLF.

8 Claims, 17 Drawing Sheets

(56) References Cited

U.S. PATENT DOCUMENTS

| | | | |
|---|---|---|---|
| 2018/0368124 A1* | 12/2018 | Liu | H04L 1/00 |
| 2019/0081689 A1* | 3/2019 | Yu | H04W 24/04 |
| 2019/0289510 A1* | 9/2019 | Rugeland | H04W 36/30 |
| 2020/0052943 A1* | 2/2020 | Jassal | H04B 7/0695 |
| 2020/0059397 A1* | 2/2020 | da Silva | H04B 7/0617 |

OTHER PUBLICATIONS

Ericsson, "Remaining stage-2 aspects of RLM and RLF in NR", R2-1707272, 3GPP TSG-RAN WG2 #ad hoc 2, QingDao,China Jun. 27-29, 2017, 4 pages.

Huawei, HiSilicon, "Radio link monitoring and beam failure recovery", R1-1712146, 3GPP TSG RAN WG1 Meeting #90, Prague, Czech Republic, Aug. 21-25, 2017, 3 pages.

LG Electronics Inc., "RLM and RLF", R2-1703630, 3GPP TSG-RAN2 Meeting #97bis, Spokane, U.S.A., Apr. 3-7, 2017, 2 pages.

LG Electronics, "Discussion on Radio Link Monitoring in NR", R1-1715848, 3GPP TSG RAN WG1 Meeting NR#3, Nagoya, Japan Sep. 18-21, 2017, 8 pages.

EP Extended European Search Report in European Appln. No. 18864856.2, dated May 27, 2021, 8 pages.

Intel Corporation, "Beam failure and radio link failure handlings," R2-1707052 (Revised R2-1704808), Presented at 3GPP TSG RAN WG2 NR Ad-Hoc, Qingdao, China, Jun. 27-29, 2017, 5 pages.

Oppo, "Discussion on NR Beam Failure and Radio Link Failure," R2-1710237, Presented at 3GPP TSG-RAN2 Meeting 99bis, Prague, Czech Republic, Oct. 9-13, 2017, 4 pages.

\* cited by examiner

METHOD AND APPARATUS FOR DECLARING RLF

CROSS-REFERENCE TO RELATED APPLICATIONS

This application is a National Stage application under 35 U.S.C. § 371 of International Application No. PCT/KR2018/011815, filed on Oct. 8, 2018, which claims the benefit of U.S. Provisional Application No. 62/569,414 filed on Oct. 6, 2017. The disclosures of the prior applications are incorporated by reference in their entirety.

BACKGROUND OF THE DISCLOSURE

Field of the Disclosure

The present invention relates to a wireless communication system, and more particularly, to a method for a user equipment (UE) to declare a radio link failure (RLF) and an apparatus supporting the same.

Related Art

A UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be a radio link failure (RLF).

If the RLF is determined, the UE abandons maintaining communication with the current serving cell, selects a new cell through cell selection (or cell reselection) procedure, and attempts RRC connection re-establishment with the new cell.

Meanwhile, considering procedures for beam recovery in a physical layer or a MAC layer, it is not clear how the UE (e.g. UE RRC) triggers radio link failure. Especially, in case that reference signals (RS) for beam management and radio link monitoring are different, it is possible that failure of the beam recovery is declared while in-sync is provided to the UE RRC. In this situation, it is also possible that the beam will be recovered after some time or recovery using the RS for RLM could be used for beam recovery so that it would not be good to declare right after beam recovery failure. Thus, a method for a UE to declare RLF and an apparatus supporting the same need to be proposed.

SUMMARY OF THE DISCLOSURE

One embodiment provides a method for declaring a radio link failure (RLF) by a radio resource control (RRC) layer of a user equipment (UE). The method may include: receiving information on failure of beam recovery, from a lower layer of the UE; receiving at least one out-of-sync (OOS) signal, from the lower layer of the UE; and when a number of OOS signals which is received after receiving the information on failure of beam recovery satisfies a threshold value, declaring the RLF.

Another embodiment provides a radio resource control (RRC) layer of a user equipment (UE) declaring a radio link failure (RLF). The UE may include: a memory; a transceiver; and a processor connected with the memory and the transceiver, and configured to: receive information on failure of beam recovery, from a lower layer of the UE; receive at least one out-of-sync (OOS) signal, from the lower layer of the UE; and when a number of OOS signals which is received after receiving the information on failure of beam recovery satisfies a threshold value, declare the RLF.

Another embodiment provides a method for operating base station (BS). The method may include: transmitting configuration for triggering a radio link failure (RLF) to a user equipment (UE), wherein information on failure of beam recovery is transmitted from a lower layer of the UE to a radio resource control (RRC) layer of the UE, and wherein the RFL is declared when a number of out-of-sync (OOS) signals which is received from the lower layer of the UE after receiving the information on failure of beam recovery satisfies a threshold value.

Problematic beams can be recovered some time after beam recovery failure.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
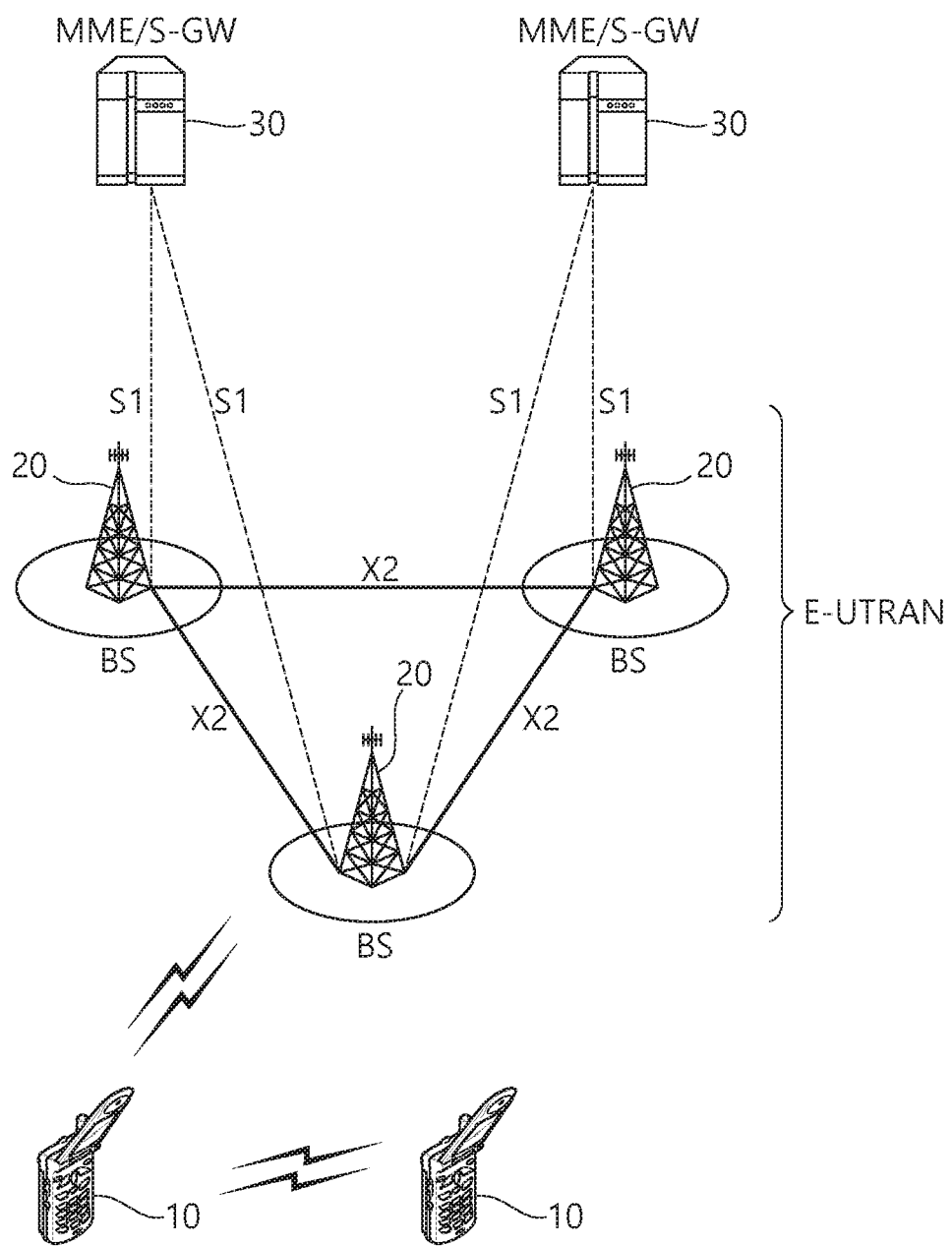
FIG. 1 shows an example of a wireless communication system to which technical features of the present invention may be applied.

FIG. 1 shows an example of a wireless communication system to which technical features of the present invention may be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMES/S-GWs and BSs.

Figure 2:
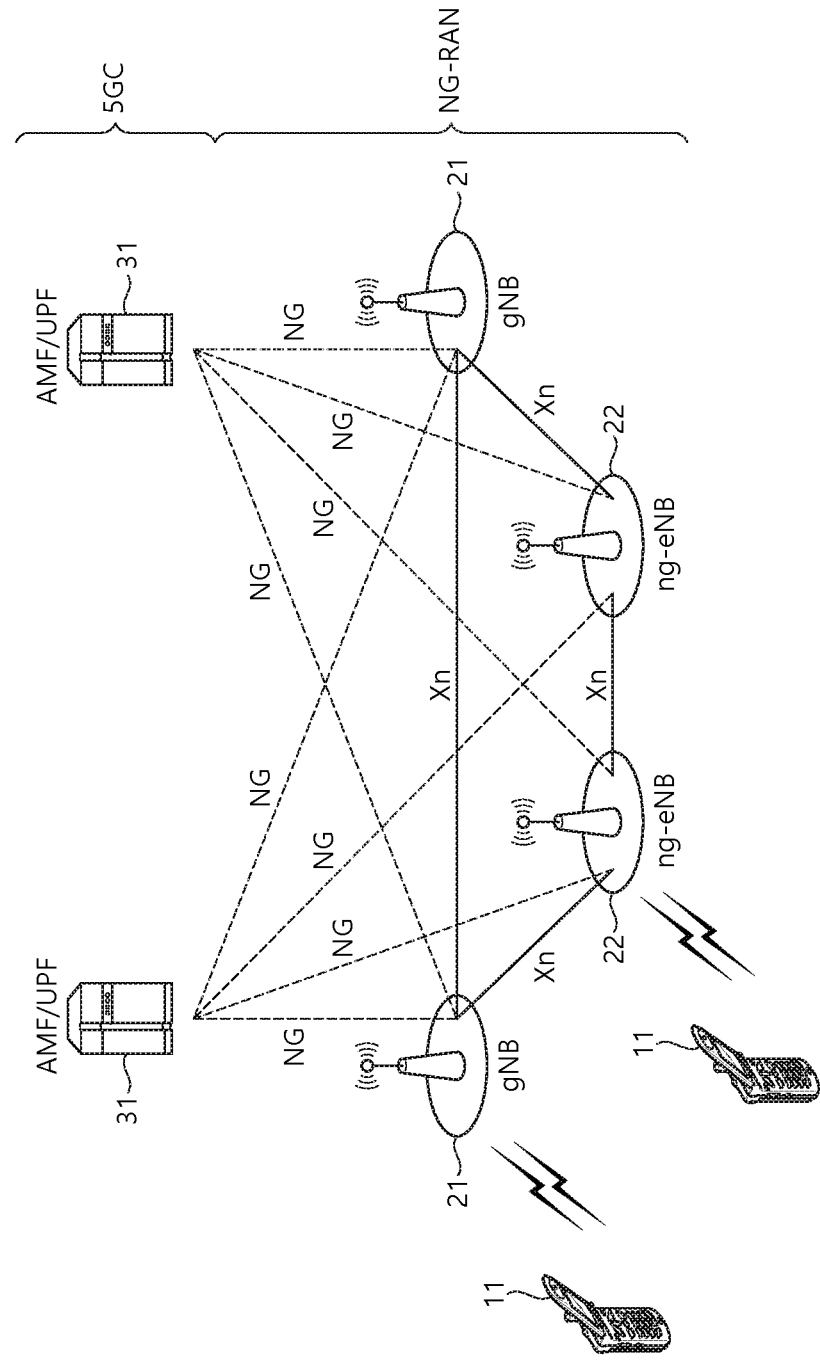
FIG. 2 shows another example of a wireless communication system to which technical features of the present invention may be applied.

FIG. 2 shows another example of a wireless communication system to which technical features of the present invention may be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
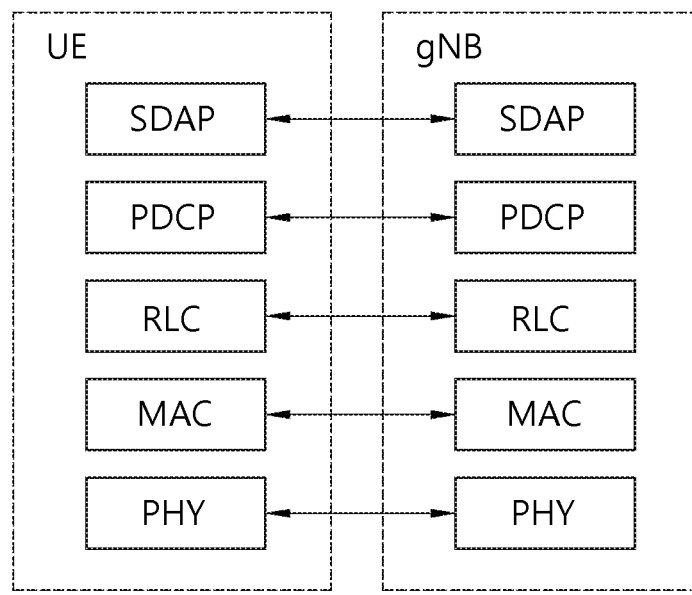
FIG. 3 shows a block diagram of a user plane protocol stack to which technical features of the present invention may be applied.
Figure 4:
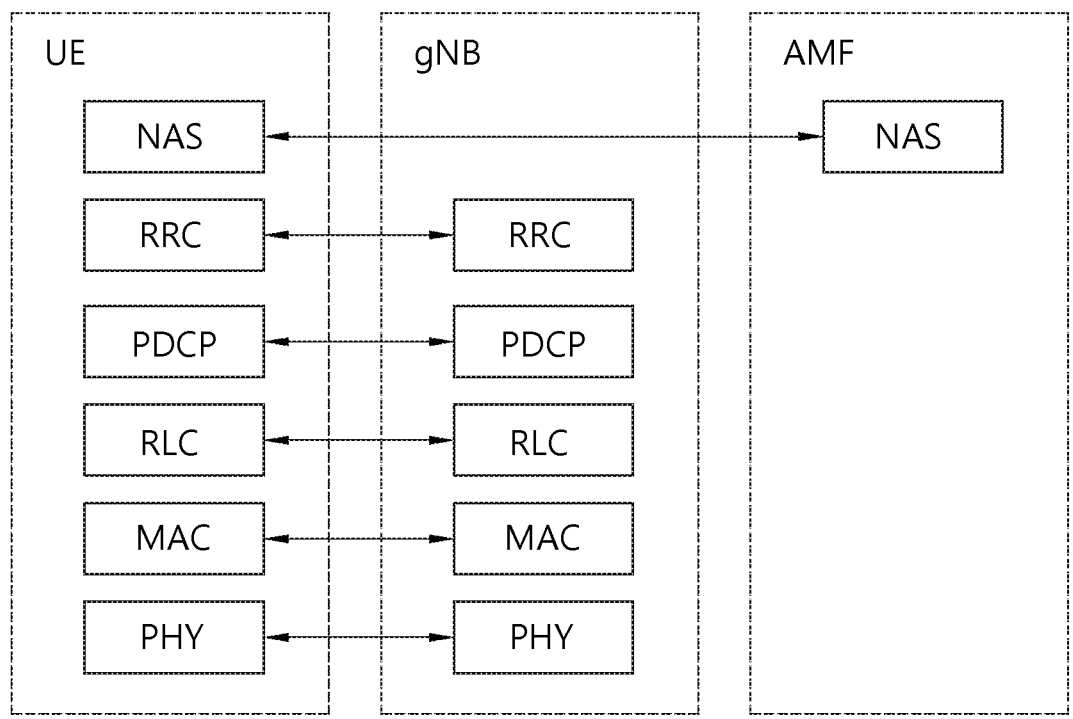
FIG. 4 shows a block diagram of a control plane protocol stack to which technical features of the present invention may be applied.

FIG. 3 shows a block diagram of a user plane protocol stack to which technical features of the present invention may be applied. FIG. 4 shows a block diagram of a control plane protocol stack to which technical features of the present invention may be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARD), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 5:
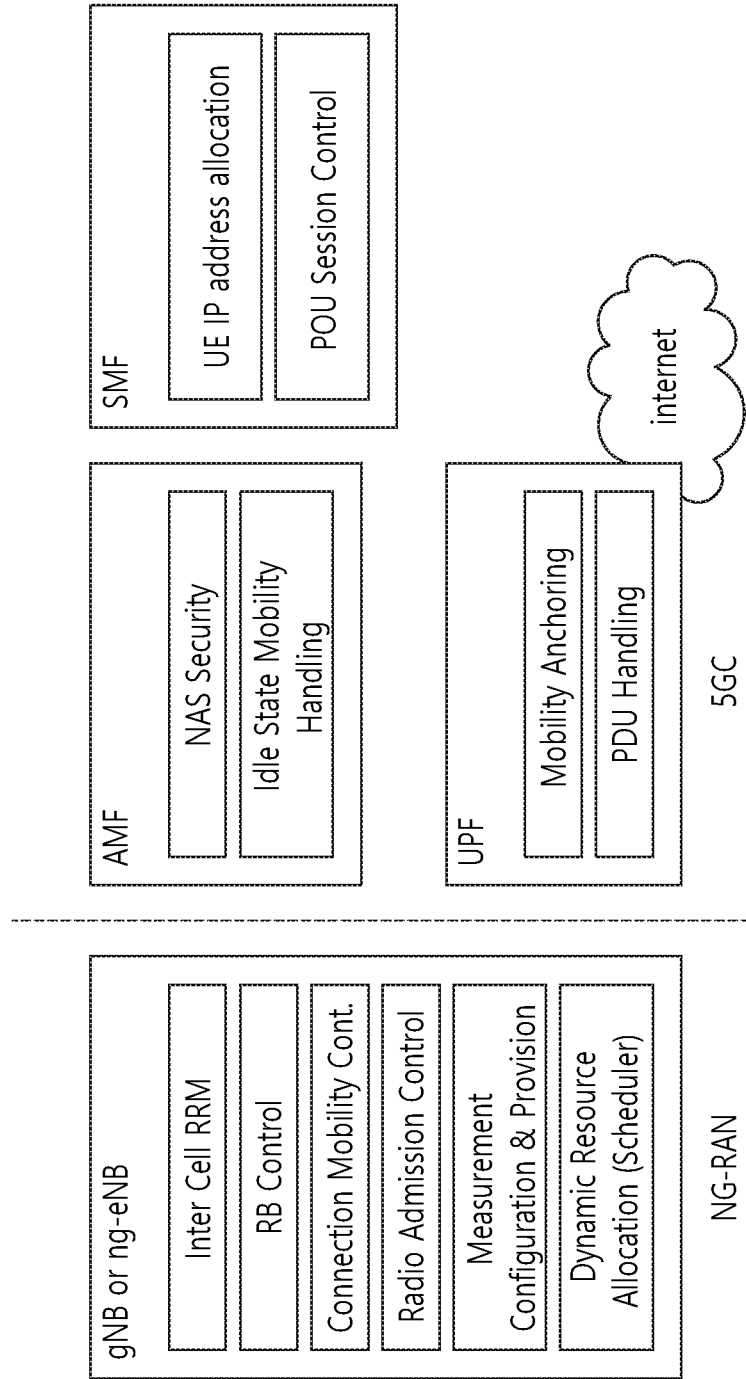
FIG. 5 shows functional split between NG-RAN and 5GC to which technical features of the present invention may be applied.

FIG. 5 shows functional split between NG-RAN and 5GC to which technical features of the present invention may be applied.

Referring to FIG. 5, the gNB and ng-eNB may host the following functions:

Functions for Radio Resource Management: Radio Bearer Control, Radio Admission Control, Connection Mobility Control, Dynamic allocation of resources to UEs in both uplink and downlink (scheduling);

IP header compression, encryption and integrity protection of data;

Selection of an AMF at UE attachment when no routing to an AMF can be determined from the information provided by the UE;

Routing of User Plane data towards UPF(s);

Routing of Control Plane information towards AMF;

Connection setup and release;

Scheduling and transmission of paging messages;

Scheduling and transmission of system broadcast information (originated from the AMF or O&M);

Measurement and measurement reporting configuration for mobility and scheduling;

Transport level packet marking in the uplink;

Session Management;

Support of Network Slicing;

QoS Flow management and mapping to data radio bearers;

Support of UEs in RRC_INACTIVE state;

Distribution function for NAS messages;

Radio access network sharing;

Dual Connectivity;

Tight interworking between NR and E-UTRA.

The Access and Mobility Management Function (AMF) may host the following main functions:

NAS signalling termination;

NAS signalling security;

AS Security control;

Inter CN node signalling for mobility between 3GPP access networks;

Idle mode UE Reachability (including control and execution of paging retransmission);

Registration Area management;

Support of intra-system and inter-system mobility;

Access Authentication;

Access Authorization including check of roaming rights;

Mobility management control (subscription and policies);

Support of Network Slicing;

SMF selection.

The User Plane Function (UPF) may host the following main functions:

Anchor point for Intra-/Inter-RAT mobility (when applicable);

External PDU session point of interconnect to Data Network;

Packet routing & forwarding;

Packet inspection and User plane part of Policy rule enforcement;

Traffic usage reporting;

Uplink classifier to support routing traffic flows to a data network;

Branching point to support multi-homed PDU session;

QoS handling for user plane, e.g. packet filtering, gating, UL/DL rate enforcement;

Uplink Traffic verification (SDF to QoS flow mapping);

Downlink packet buffering and downlink data notification triggering.

The Session Management function (SMF) may host the following main functions:

Session Management;

UE IP address allocation and management;

Selection and control of UP function;

Configures traffic steering at UPF to route traffic to proper destination;

Control part of policy enforcement and QoS;

Downlink Data Notification.

Figure 6:
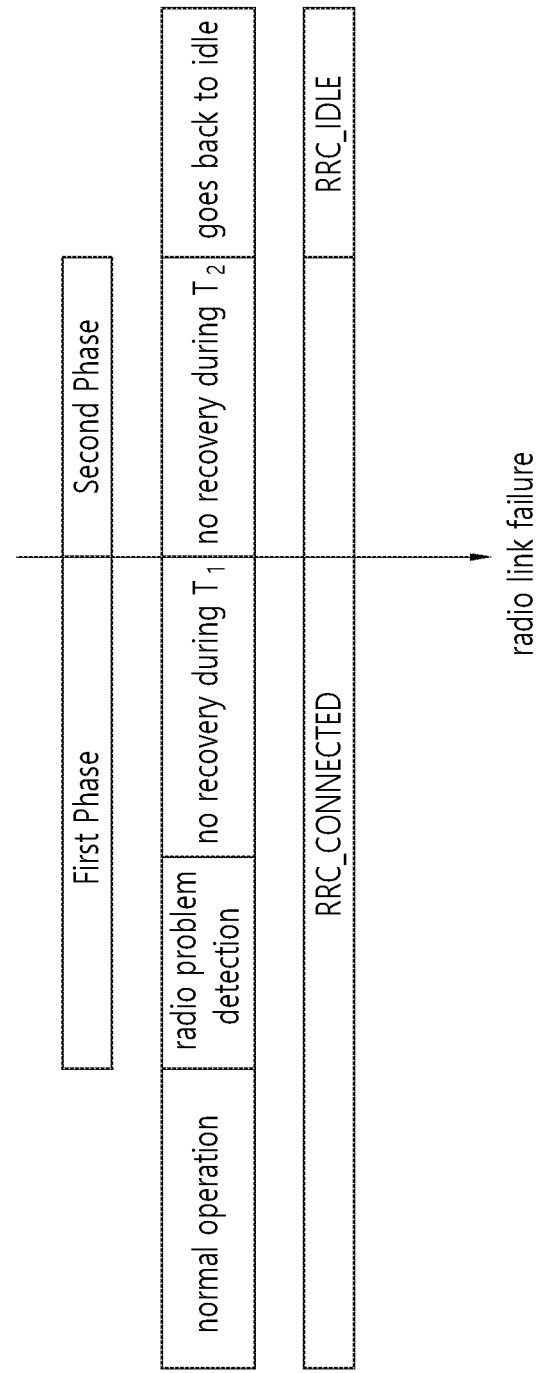
FIG. 6 shows a radio link monitoring (RLM) and radio link failure (RLF) procedure.

FIG. 6 shows a radio link monitoring (RLM) and radio link failure (RLF) procedure.

It is assumed that a UE is in the RRC_CONNECTED, and performs a normal operation. At a first phase, the UE detect whether there is currently a problem with a radio link. If there is a problem with the radio link, the UE declares a radio link problem, and waits for recovering of the radio link during a certain time, i.e. T1. If the radio link is not recovered during the time T1 at the first phase, the UE declares a radio link failure, and enters a second phase. At the second phase, the UE performs an RRC connection reestablishment procedure during time T2 in order to recover the radio link from the radio link failure. If the radio link is not recovered during the time T2 at the second phase, the UE may go back to the RRC_IDLE.

Hereinafter, radio link failure (RLF) is described in detail.

In RRC_CONNECTED, a UE may declare RLF when one of the following criteria are met:

Expiry of a timer started after indication of radio problems from the physical layer (if radio problems are recovered before the timer is expired, the UE stops the timer); or Random access procedure failure; or RLC failure.

After RLF is declared, the UE may stay in RRC_CONNECTED and select a suitable cell and then initiate RRC re-establishment. If a suitable cell wasn't found within a certain time after RLF was declared, the UE may enter RRC_IDLE.

Hereinafter, radio link monitoring (RLM) is described in detail.

The UE shall monitor the downlink link quality based on the cell-specific reference signal in order to detect the downlink radio link quality of the primary cell (PCell). The UE shall estimate the downlink radio link quality and compare it to the thresholds Qout and Qin for the purpose of monitoring downlink radio link quality of the PCell. The threshold Qout is defined as the level at which the downlink radio link cannot be reliably received and shall correspond to 10% block error rate of a hypothetical PDCCH transmission taking into account the physical control format indicator channel (PCFICH) errors with transmission parameters specified in Table 1.

TABLE 1

| Attribute | Value |
| --- | --- |
| DCI format | 1 A |
| Number of control OFDM symbols | 2; Bandwidth ≥ 10 MHz<br>3; 3 MHz ≤ Bandwidth ≤ 10 MHz<br>4; Bandwidth = 1.4 MHz |
| Aggregation level (CCE) | 4; Bandwidth = 1.4 MHz<br>8; Bandwidth ≥ 3 MHz |
| Ratio of PDCCH RE energy to average RS RE energy | 4 dB; when single antenna port is used for cell-specific reference signal transmission by the PCell or PSCell.<br>1 dB: when two or four antenna ports are used for cell-specific reference signal transmission by the PCell or PSCell. |
| Ratio of PCFICH RE energy to average RS RE energy | 4 dB; when single antenna port is used for cell-specific reference signal transmission by the PCell or PSCell.<br>1 dB: when two or four antenna ports are used for cell-specific reference signal transmission by the PCell or PSCell. |

The threshold Qin is defined as the level at which the downlink radio link quality can be significantly more reliably received than at Qout and shall correspond to 2% block error rate of a hypothetical PDCCH transmission taking into account the PCFICH errors with transmission parameters specified in Table 2.

TABLE 2

| Attribute | Value |
| --- | --- |
| DCI format | 1 C |
| Number of control OFDM symbols | 2; Bandwidth ≥ 10 MHz<br>3; 3 MHz ≤ Bandwidth ≤ 10 MHz<br>4; Bandwidth = 1.4 MHz |
| Aggregation level (CCE) | 4 |
| Ratio of PDCCH RE energy to average RS RE energy | 0 dB; when single antenna port is used for cell-specific reference signal transmission by the PCell or PSCell. −3 dB; when two or four antenna ports are used for cell-specific reference signal transmission by the PCell or PSCell. |
| Ratio of PCFICH RE energy to average RS RE energy | 4 dB; when single antenna port is used for cell-specific reference signal transmission by the PCell or PSCell.<br>1 dB: when two or four antenna ports are used for cell-specific reference signal transmission by the PCell or PSCell. |

Hereinafter, beam management is described.

Millimeter wave (MmW) communication systems typically implement directional transmissions, e.g., using high-dimensional phased arrays, to benefit from the resulting beamforming gain and compensate for the increased path loss experienced at high frequencies. Therefore, next-generation cellular networks must provide a mechanism by which UEs and base stations (e.g. gNBs) regularly identify the optimal beams to interconnect at any given time.

To this goal, a downlink architecture where the synchronization and reference signals (i.e., synchronization signal (SS) blocks and channel state information—reference signals (CSI-RSs), respectively) are broadcast by the base stations and received by the UEs within reach is defined. In particular, the following four operations are defined:

Beam sweeping, i.e., the covering of a spatial area with a set of beams transmitted and received according to prespecified intervals and directions.

Beam measurement, i.e., the evaluation of the quality of the received signal, which can be expressed in terms of reference signal received power (RSRP)—the linear average of the received power on different resources with synchronization signals, the reference signal received quality (RSRQ)—the ratio between the RSRP and the received signal strength indicator (RSSI), a measurement that includes also thermal noise and signals from other sources, or the signal to interference plus noise ratio (SINR).

Beam determination, i.e., the selection of the optimal beam (or set of beams) to set up a directional (and fully beamformed) communication.

Beam reporting, i.e., the procedure with which the nodes send to the RAN information on the quality of the received beamformed signals and on their decision in the beam determination phase.

Further, the UE may trigger a mechanism to recover from beam failure. A beam failure event occurs when quality of beam pair link(s) of an associated control channel falls low enough (i.e., involving comparison with a threshold and time-out of an associated timer). The mechanism to recover from beam failure may be triggered when beam failure occurs.

Meanwhile, considering procedures for beam recovery in the PHY or the MAC, it is not clear how the UE (e.g. UE RRC) triggers radio link failure. Especially, in case that reference signals (RS) for beam management and radio link monitoring are different, it is possible that failure of the beam recovery is declared while in-sync is provided to the UE RRC. In this situation, it is also possible that the beam will be recovered after some time or recovery using the RS for RLM could be used for beam recovery so that it would not be good to declare right after beam recovery failure. Thus, a method for a UE to declare RLF and an apparatus supporting the same need to be proposed.

Figure 7:
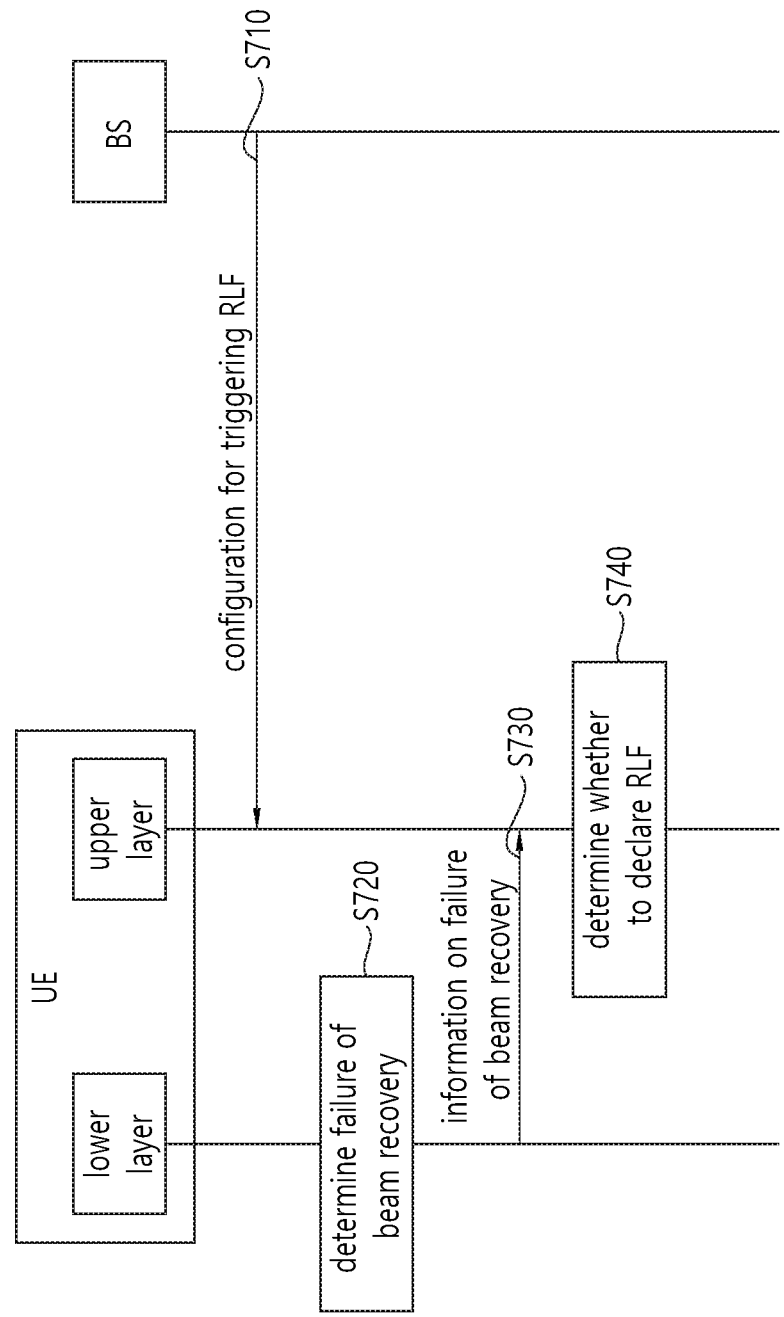
FIG. 7 shows a procedure for declaring RLF according to an embodiment of the present invention.

FIG. 7 shows a procedure for declaring RLF according to an embodiment of the present invention.

According to an embodiment of the present invention, reference signals (RSs) for beam management and RLM may be different, and/or bandwidth parts for beam management and RLM may be different, and/or PDCCH resources for beam management and RLM may be different.

Figure 8:
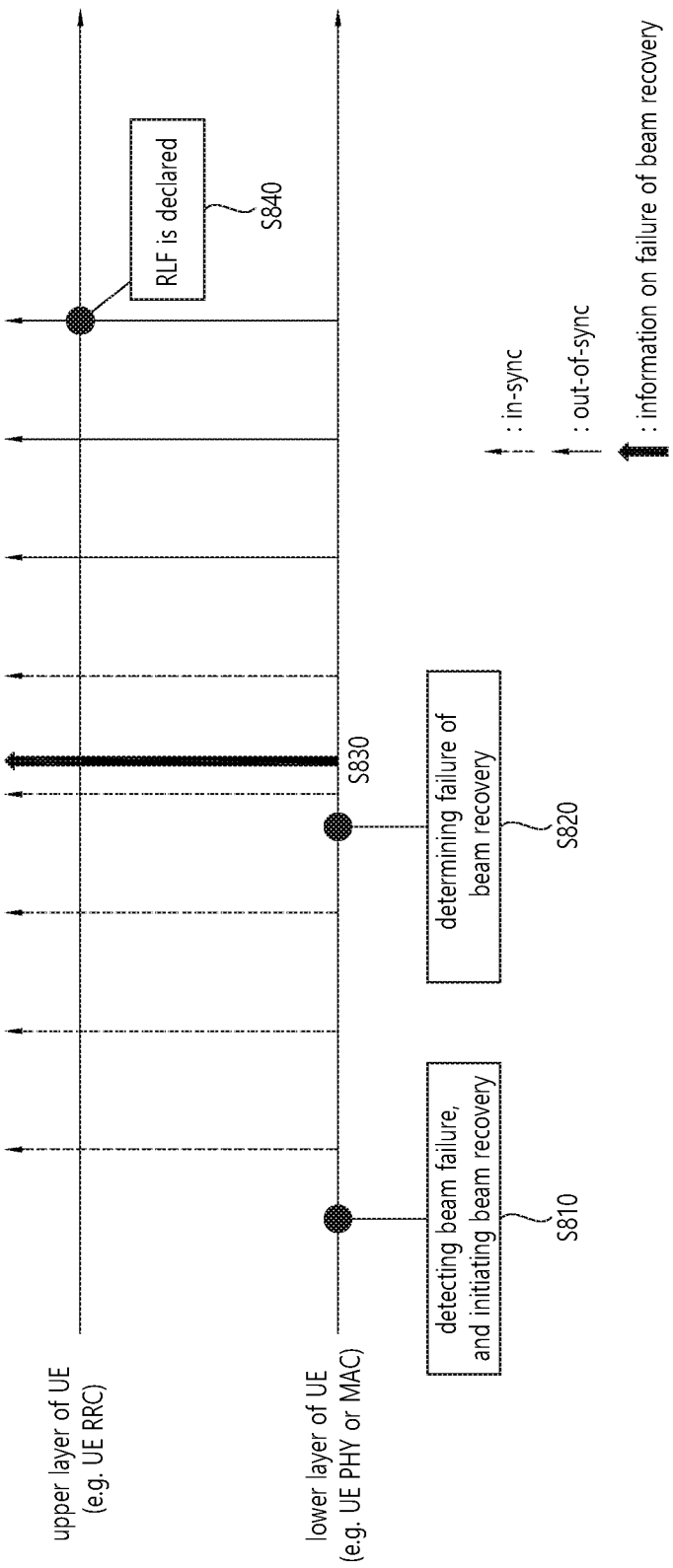
FIG. 8 shows an example in which a UE declares RLF according to an embodiment of the present invention.

Referring to FIG. 8, in step S710, a UE may receive configuration for triggering RLF from a base station. The configuration for triggering RLF may include at least one threshold and/or at least one timer value. The at least one threshold and/or at least one timer value may be used for determining whether to declare RLF.

In step S720, the UE may determine failure of beam recovery. The failure of beam recovery may be determined by a lower layer of the UE. For instance, the lower layer may be PHY layer. For instance, the lower layer may be MAC layer.

In step S730, the lower layer of the UE may send information on failure of beam recovery to an upper layer of the UE. For instance, the upper layer may be RRC layer. For instance, an indication from PHY layer may indicate that beam recovery has been failed. The indication may be other indication which indicates that physical radio channel is unrecoverable and/or bad other than out-of-sync (OOS).

In step S740, the UE may determine whether or not to declare RLF. Whether or not to declare RLF may be determined by the upper layer of the UE. Based on at least one of following RLF conditions from the upper layer (e.g. UE RRC) viewpoint, the UE may determine whether or not to declare RLF.

(1) RLF condition 1: if the number of out-of-syncs received from the lower layer satisfies a threshold value after receiving the information on failure of beam recovery from the lower layer, the UE may declare RLF. For instance, if the number of out-of-syncs received from the lower layer is equal to or above a certain threshold after receiving the indication from the lower layer, the UE may declare RLF. For instance, if the number of consecutive out-of-syncs received from the lower layer is equal to or above a certain threshold after receiving the indication from the lower layer, the UE may declare RLF. The certain threshold may be received by being included in the configuration for triggering RLF. Alternatively, the certain threshold may be fixed value.

Alternatively, if the number of out-of-syncs received from the lower layer does not satisfy the threshold value after receiving the information on failure of beam recovery from the lower layer, the UE may not declare RLF.

(2) RLF condition 2: if the number of in-syncs received from the lower layer does not satisfy a threshold value during a timer is running, the UE may declare RLF. For instance, during the timer is running, unless the number of in-syncs received from the lower layer is equal to or above a certain threshold, the UE may declare RLF. For instance, during the timer is running, unless the number of consecutive in-syncs received from the lower layer is equal to or above a certain threshold, the UE may declare RLF. The timer may be started upon receiving the information on failure of beam recovery from the lower layer. The UE may declare RLF when the timer expires.

Alternatively, if the number of in-syncs is received from the lower layer satisfies the threshold value during the timer is running, the UE may stop or reset the timer. Since the timer does not expire, the UE may not declare RLF.

(3) RLF condition 3: if the number of out-of-syncs received from the lower layer satisfies a threshold value before receiving the information on failure of beam recovery from the lower layer, the UE may declare RLF. For instance, if the number of out-of-syncs received from the lower layer is equal to or above a certain threshold when receiving the indication from the lower layer, the UE may declare RLF. For instance, if the number of consecutive out-of-syncs received from the lower layer is equal to or above a certain threshold when receiving the indication from the lower layer, the UE may declare RLF.

Alternatively, if the number of out-of-syncs received from the lower layer does not satisfy the threshold value before receiving the information on failure of beam recovery from the lower layer, the UE may not declare RLF.

(4) RLF condition 4: if other RLF related timers is running when the upper layer receives the information on failure of beam recovery from the lower layer, the UE may declare RLF. For instance, the RLF related timer may be T310 which indicates that the UE RRC has received a certain amount of consecutive out-of-sync.

(5) RLF condition 5: if information on success of beam recovery is not received from the lower layer during a timer is running, the UE may declare RLF. For instance, during the timer is running, unless any indication indicating beam recovery has been succeeded is received from the lower layer, the UE may declare RLF. The timer may be started upon receiving the information on failure of beam recovery from the lower layer. The UE may declare RLF when the timer expires.

Alternatively, if the information on success of beam recovery is received from the lower layer during the timer is running, the UE may stop or reset the timer. Since the timer does not expire, the UE may not declare RLF.

According to an embodiment of the present invention, it is also possible to combine the above RLF conditions. For instance, in case that the RLF conditions 1 and 3 are combined, if the number of out-of-syncs (or consecutive out-of-syncs) received from the lower layer is equal to or above the certain threshold when receiving the information on failure of beam recovery from the lower layer, and if the number of out-of-sync (or consecutive out-of-syncs) received from the lower layer is equal to or above the certain threshold after receiving the information on failure of beam recovery from the lower layer, the UE may declare RLF. For instance, in case that the RLF conditions 2 and 3 are combined, if the number of out-of-syncs (or consecutive out-of-syncs) received from the lower layer is equal to or above the certain threshold when receiving the information on failure of beam recovery from the lower layer, and if the number of in-syncs (or consecutive in-syncs) received from the lower layer is below the certain threshold during the timer is running, the UE may declare RLF.

If the above RLF conditions are not met, the UE may not declare RLF. Further, if there are other RLF related timers (e.g. T310) which is running, the UE may stop the other RLF related timers. Alternatively, if there are other RLF related timers (e.g. T310) which is running, the UE may keep the timer run. If any timer among other RLF related timer and the timer in the above RLF condition 2 is expired, the UE may declare RLF.

Desirably, the above behavior for triggering RLF can be configured by a network (e.g. base station). If the network configures above mentioned RLF behavior, the UE may behave according to the method described above. Otherwise, the UE may follow the existing RLF triggering behaviors.

Further, if RLF occurs in a master cell group (MCG), the UE may perform re-establishment procedure. If RLF occurs in a secondary cell group (SCG), the UE may transmit a SCG failure information to the network. The SCG failure information may include a failure cause, and/or measurement results of serving cells and neighbour cells.

The value for the thresholds and timers may be configured by the network or fixed.

According to an embodiment of the present invention, the UE may evaluate at least one RLF condition and declaring RLF when at least one RLF condition is met. According to an embodiment of the present invention, thus, it is possible that the problematic beams are recovered some time after beam recovery failure. Hence, the unnecessary declaration of RLF is avoided in situations that RLF can be resolved by e.g. removal of obstacles. As a consequence, it would reduce the time taken for RRC connection re-establishment which is performed after declaring RLF. The improvement of user experience is also achieved.

FIG. 8 shows an example in which a UE declares RLF according to an embodiment of the present invention.

Referring to FIG. 8, in step S810, the lower layer of the UE may detect beam failure and initiate a beam recovery procedure. Then, in step S820, the lower layer of the UE may determine failure of the beam recovery. If the lower layer of the UE determines failure of the beam recovery, in step S830, the lower layer of the UE may send information on failure of beam recovery (e.g. beam recovery failure indication) to the upper layer of the UE. For instance, the lower layer may be PHY layer or MAC layer, and the upper layer may be RRC layer. In the embodiment of FIG. 8, it is assumed that the threshold value is 3. After the upper layer of the UE receives information on failure of beam recovery from the lower layer of the UE, if the number of out-of-syncs reaches the threshold value (i.e. 3), in step S840, the UE may declare RLF.

Figure 9:
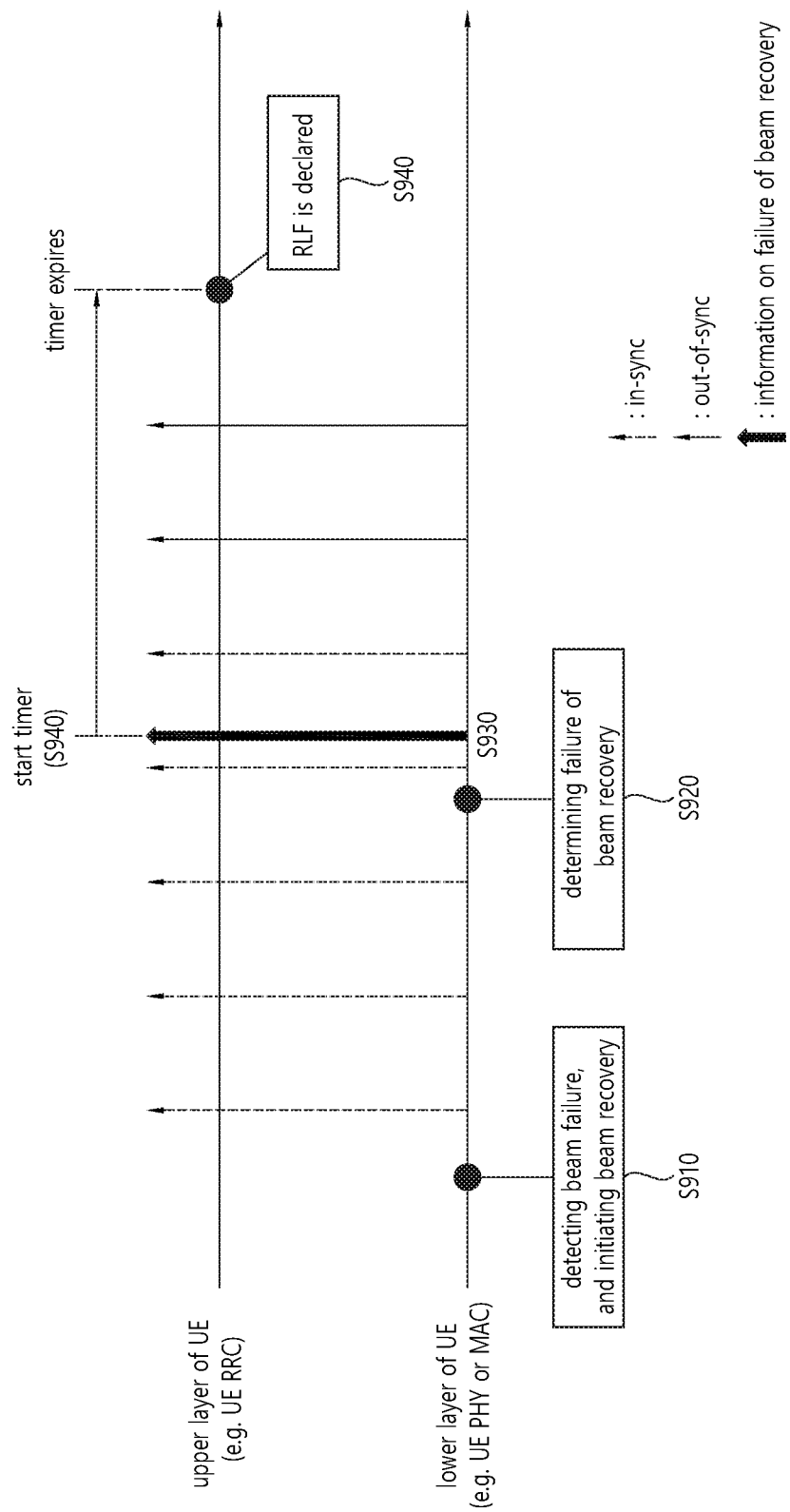
FIG. 9 shows an example in which a UE declares RLF according to an embodiment of the present invention.

FIG. 9 shows an example in which a UE declares RLF according to an embodiment of the present invention.

Referring to FIG. 9, in step S910, the lower layer of the UE may detect beam failure and initiate a beam recovery procedure. Then, in step S920, the lower layer of the UE may determine failure of the beam recovery. If the lower layer of the UE determines failure of the beam recovery, in step S930, the lower layer of the UE may send information on failure of beam recovery (e.g. beam recovery failure indication) to the upper layer of the UE. For instance, the lower layer may be PHY layer or MAC layer, and the upper layer may be RRC layer. After the information on failure of beam recovery is received from the lower layer, in step S940, the upper layer of the UE may start a timer. In the embodiment of FIG. 9, it is assumed that the threshold value is 2. During the timer is running, the number of consecutive in-syncs (i.e. 1) is less than the threshold value (i.e. 2). Since the number of consecutive in-syncs is less than threshold during the timer is running, the timer may expire. When the timer expires, in step S950, the UE may declare RLF.

Figure 10:
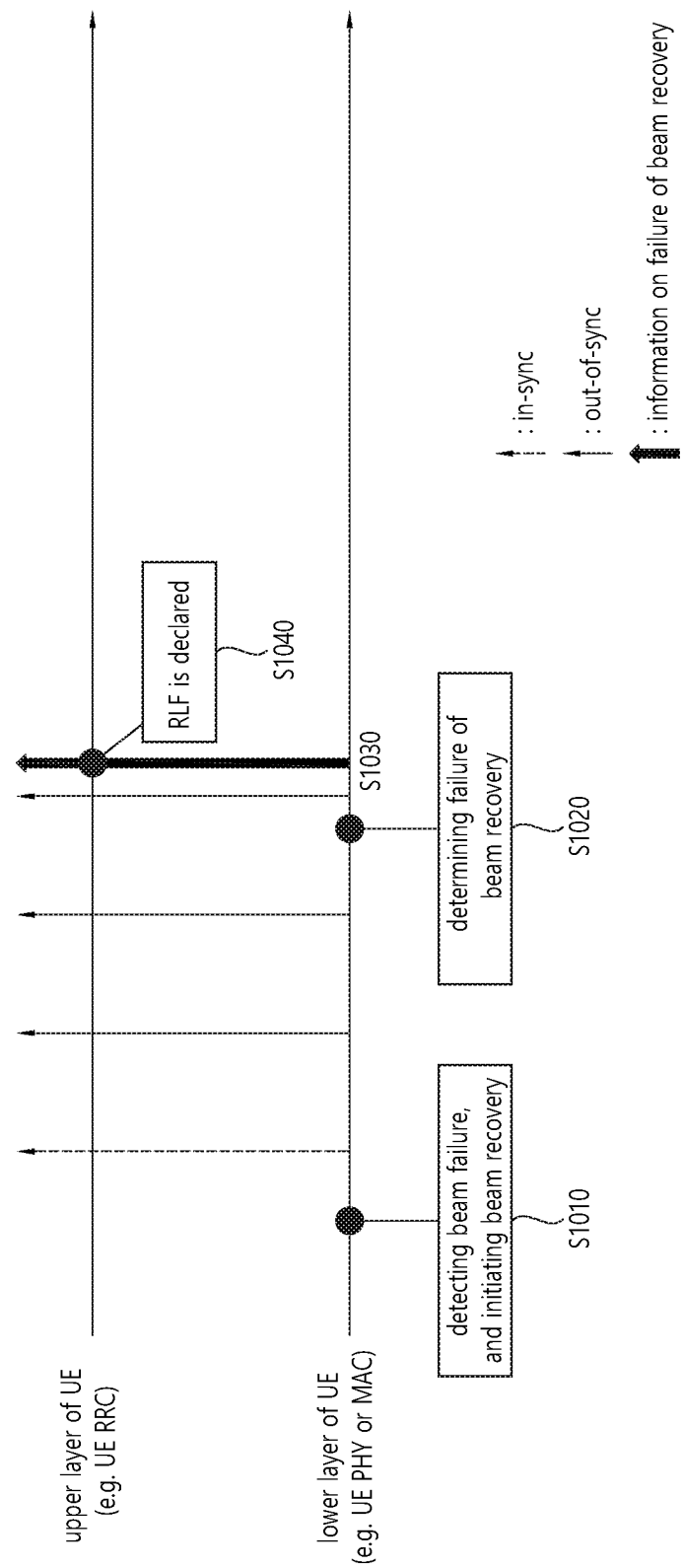
FIG. 10 shows an example in which a UE declares RLF according to an embodiment of the present invention.

FIG. 10 shows an example in which a UE declares RLF according to an embodiment of the present invention.

Referring to FIG. 10, in step S1010, the lower layer of the UE may detect beam failure and initiate a beam recovery procedure. Then, in step S1020, the lower layer of the UE may determine failure of the beam recovery. If the lower layer of the UE determines failure of the beam recovery, in step S1030, the lower layer of the UE may send information on failure of beam recovery (e.g. beam recovery failure indication) to the upper layer of the UE. For instance, the lower layer may be PHY layer or MAC layer, and the upper layer may be RRC layer. In the embodiment of FIG. 10, it is assumed that the threshold value is 2. Before the upper layer of the UE receives information on failure of beam recovery from the lower layer of the UE, the upper layer of the UE receives 3 consecutive out-of-syncs. Since the number of consecutive out-of-syncs is above the threshold value (i.e. 2), in step S1040, the UE may declare RLF when the upper layer of the UE receives the information on failure of beam recovery.

Figure 11:
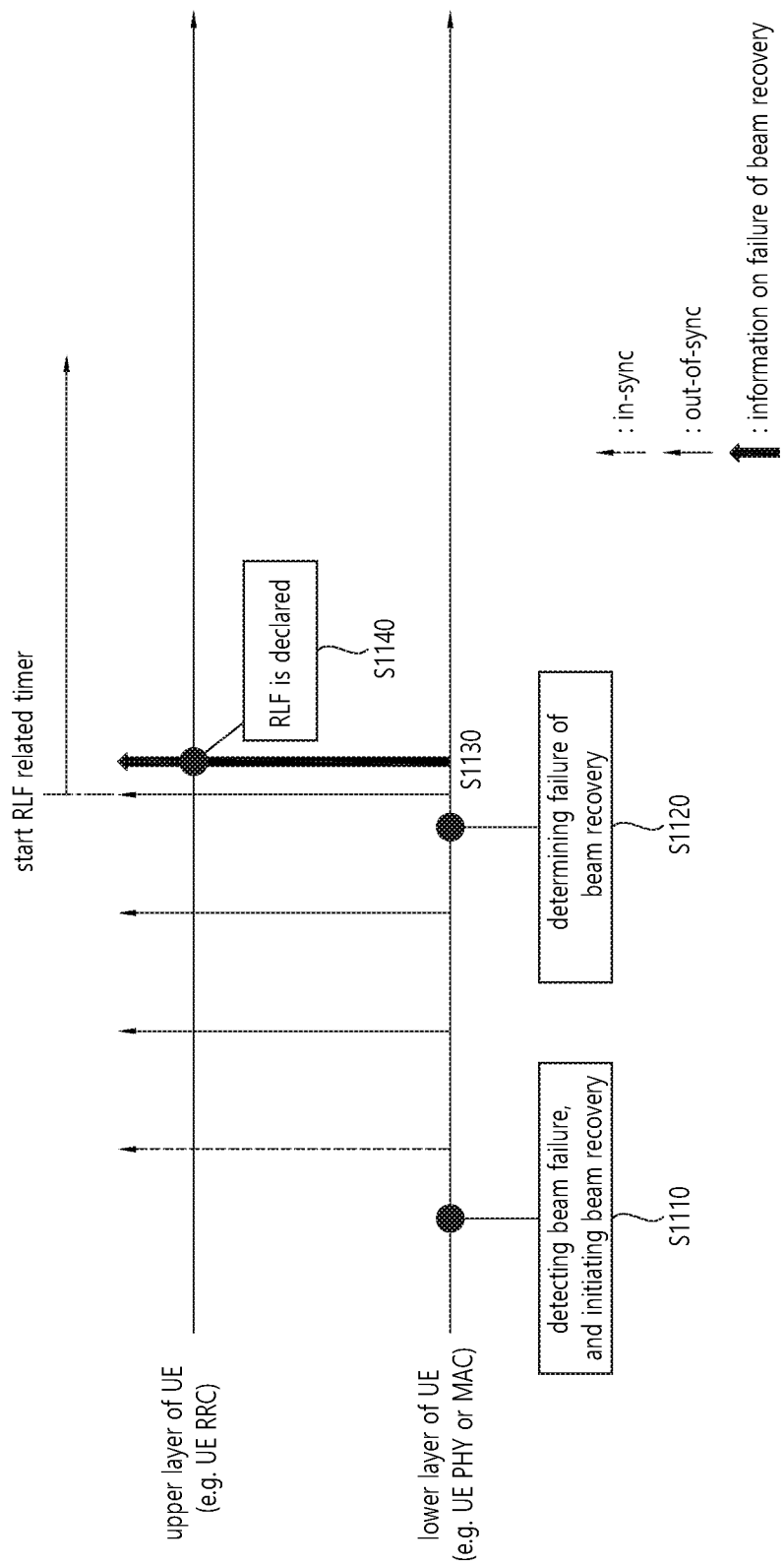
FIG. 11 shows an example in which a UE declares RLF according to an embodiment of the present invention.

FIG. 11 shows an example in which a UE declares RLF according to an embodiment of the present invention.

Referring to FIG. 11, in step S1110, the lower layer of the UE may detect beam failure and initiate a beam recovery procedure. Then, in step S1120, the lower layer of the UE may determine failure of the beam recovery. If the lower layer of the UE determines failure of the beam recovery, in step S1130, the lower layer of the UE may send information on failure of beam recovery (e.g. beam recovery failure indication) to the upper layer of the UE. For instance, the lower layer may be PHY layer or MAC layer, and the upper layer may be RRC layer. If other RLF related timers (e.g. T310 which indicates that the RRC layer has received a certain amount of consecutive out-of-sync) is running before the upper layer of the UE receives the information on failure of beam recovery, in step S1140, the UE may declare RLF when the upper layer of the UE receives the information on failure of beam recovery.

Figure 12:
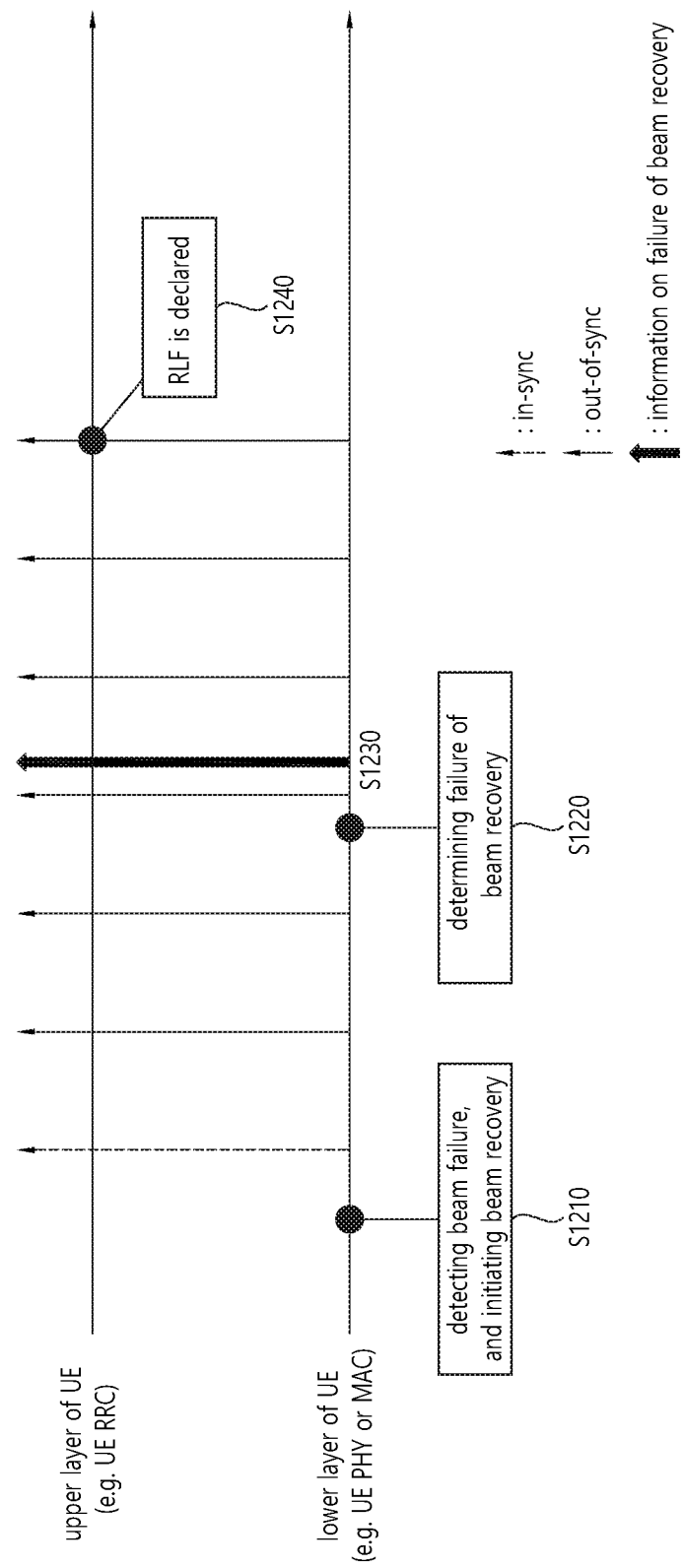
FIG. 12 shows an example in which a UE declares RLF according to an embodiment of the present invention.

FIG. 12 shows an example in which a UE declares RLF according to an embodiment of the present invention.

Referring to FIG. 12, in step S1210, the lower layer of the UE may detect beam failure and initiate a beam recovery procedure. Then, in step S1220, the lower layer of the UE may determine failure of the beam recovery. If the lower layer of the UE determines failure of the beam recovery, in step S1230, the lower layer of the UE may send information on failure of beam recovery (e.g. beam recovery failure indication) to the upper layer of the UE. For instance, the lower layer may be PHY layer or MAC layer, and the upper layer may be RRC layer. In the embodiment of FIG. 12, it is assumed that the threshold value is 3. Before the upper layer of the UE receives information on failure of beam recovery from the lower layer of the UE, the number of out-of-syncs reaches the threshold value (i.e. 3). Also, after the upper layer of the UE receives information on failure of beam recovery from the lower layer of the UE, the number of out-of-syncs reaches the threshold value (i.e. 3). Since two conditions for declaring RLF is satisfied, in step S1240, the UE may declare RLF.

Figure 13:
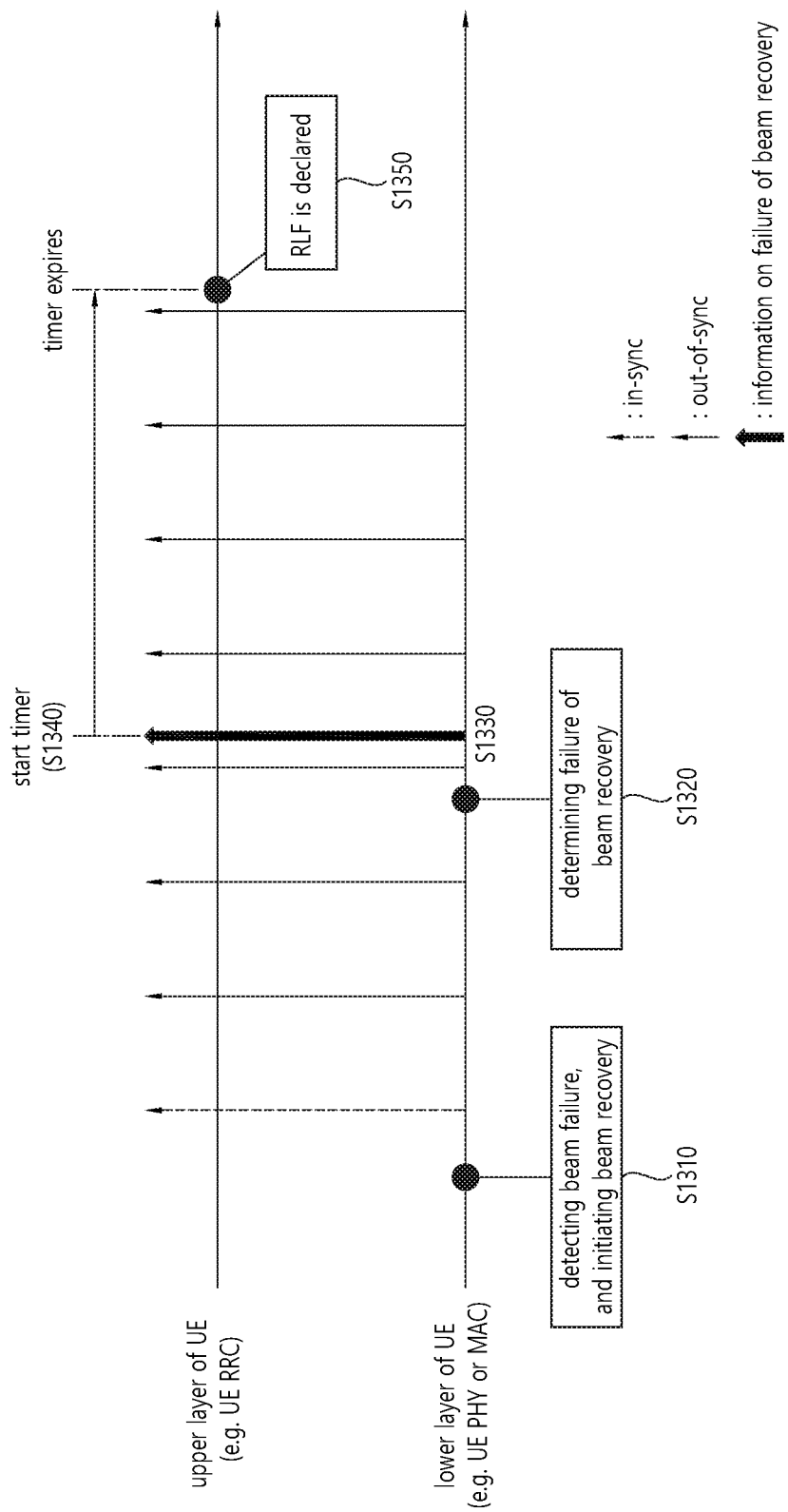
FIG. 13 shows an example in which a UE declares RLF according to an embodiment of the present invention.

FIG. 13 shows an example in which a UE declares RLF according to an embodiment of the present invention.

Referring to FIG. 13, in step S1310, the lower layer of the UE may detect beam failure and initiate a beam recovery procedure. Then, in step S1320, the lower layer of the UE may determine failure of the beam recovery. If the lower layer of the UE determines failure of the beam recovery, in step S1330, the lower layer of the UE may send information on failure of beam recovery (e.g. beam recovery failure indication) to the upper layer of the UE. For instance, the lower layer may be PHY layer or MAC layer, and the upper layer may be RRC layer. After the information on failure of beam recovery is received from the lower layer, in step S1340, the upper layer of the UE may start a timer. In the embodiment of FIG. 13, it is assumed that the threshold value is 3. Before the upper layer of the UE receives information on failure of beam recovery from the lower layer of the UE, the number of out-of-syncs reaches the threshold value (i.e. 3). Also, during the timer is running, the number of in-syncs is less than the threshold value (i.e. 3). When the timer expires, in step S1350, the UE may declare RLF.

Figure 14:
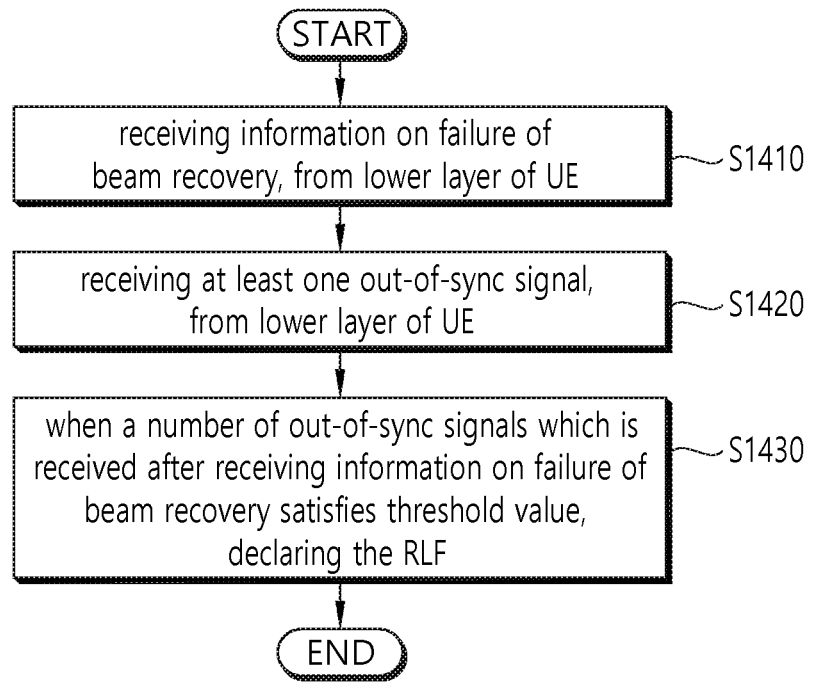
FIG. 14 shows a method for declaring RLF by a UE according to an embodiment of the present invention.

FIG. 14 shows a method for declaring RLF by a UE according to an embodiment of the present invention. The present invention described above for UE side may be applied to this embodiment.

Referring to FIG. 14, in step S1410, an upper layer of the UE may receive information on failure of beam recovery, from a lower layer of the UE. The lower layer of the UE may be a PHY layer or MAC layer. The upper layer of the UE may be a RRC layer.

Further, the upper layer of the UE may receive configuration for triggering the RLF from a base station (BS).

In step S1420, the upper layer of the UE may receive at least one out-of-sync (OOS) signal, from the lower layer of the UE.

In step S1420, the upper layer of the UE may declare RLF, when the number of OOS signals which is received after receiving the information on failure of beam recovery satisfies a threshold value.

The RLF may be declared when the number of OOS signals which is received before receiving the information on failure of beam recovery satisfies the threshold value. The RLF may be not declared when the number of OOS signals does not satisfies the threshold value.

Further, the UE may start a timer. In this case, the RLF may be declared when the number of OOS signals satisfies the threshold value while the timer is running. The RLF may be declared when information on success of beam recovery is not received from the lower layer of the UE while the timer is running. The timer may be started upon receiving the information on failure of beam recovery.

The RLF may be declared when a RLF related timer is running upon receiving the information on failure of beam recovery.

Further, the UE may receive at least one in-sync (IS) signal, from the lower layer of the UE. The RLF may be declared when the number of IS signals which is received after receiving the information on failure of beam recovery does not satisfies the threshold value. The RLF may be declared when the number of IS signals which is received before receiving the information on failure of beam recovery does not satisfies the threshold value. Further, the UE may start a timer. In this case, the RLF may be declared when the number of IS signals does not satisfies the threshold value while the timer is running. Further, the UE may stop the timer when the number of IS signals satisfies the threshold value while the timer is running. Further, the UE may stop the timer when information on success of beam recovery is received from the lower layer of the UE while the timer is running.

According to an embodiment of the present invention, the UE may evaluate at least one RLF condition and declaring RLF when at least one RLF condition is met. According to an embodiment of the present invention, thus, it is possible that the problematic beams are recovered some time after beam recovery failure. Hence, the unnecessary declaration of RLF is avoided in situations that RLF can be resolved by e.g. removal of obstacles. As a consequence, it would reduce the time taken for RRC connection re-establishment which is performed after declaring RLF. The improvement of user experience is also achieved.

Figure 15:
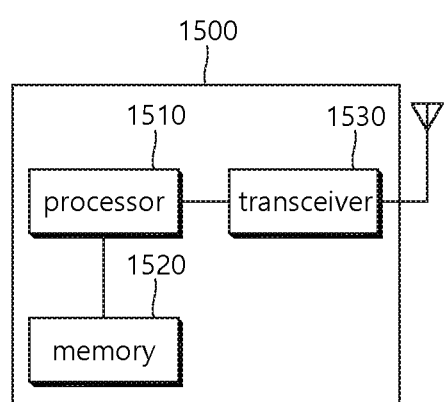
FIG. 15 shows a UE to implement an embodiment of the present invention.

FIG. 15 shows a UE to implement an embodiment of the present invention. The present invention described above for UE side may be applied to this embodiment.

A UE 1500 includes a processor 1510, a memory 1520 and a transceiver 1530. The processor 1510 may be configured to implement proposed functions, procedures and/or methods described in this description. Layers of the radio interface protocol may be implemented in the processor 1510.

Specifically, the processor 1510 may control the upper layer of the UE to receive information on failure of beam recovery from a lower layer of the UE. The lower layer of the UE may be a PHY layer or MAC layer. The upper layer of the UE may be a RRC layer.

Further, the processor 1510 may control the transceiver 1530 to receive configuration for triggering the RLF from a base station (BS).

Further, the processor 1510 may control the upper layer of the UE to receive at least one out-of-sync (OOS) signal from the lower layer of the UE.

Further, the processor 1510 may declare RLF, when the number of OOS signals which is received after receiving the information on failure of beam recovery satisfies a threshold value.

The RLF may be declared when the number of OOS signals which is received before receiving the information on failure of beam recovery satisfies the threshold value. The RLF may be not declared when the number of OOS signals does not satisfies the threshold value.

Further, the processor 1510 may start a timer. In this case, the RLF may be declared when the number of OOS signals satisfies the threshold value while the timer is running. The RLF may be declared when information on success of beam recovery is not received from the lower layer of the UE while the timer is running. The timer may be started upon receiving the information on failure of beam recovery.

The RLF may be declared when a RLF related timer is running upon receiving the information on failure of beam recovery.

Further, the processor 1510 may control the upper layer of the UE to receive at least one in-sync (IS) signal from the lower layer of the UE. The RLF may be declared when the number of IS signals which is received after receiving the information on failure of beam recovery does not satisfies the threshold value. The RLF may be declared when the number of IS signals which is received before receiving the information on failure of beam recovery does not satisfies the threshold value. Further, the processor 1510 may start a timer. In this case, the RLF may be declared when the number of IS signals does not satisfies the threshold value while the timer is running. Further, the processor 1510 may stop the timer when the number of IS signals satisfies the threshold value while the timer is running. Further, the processor 1510 may stop the timer when information on success of beam recovery is received from the lower layer of the UE while the timer is running.

The memory 1520 is operatively coupled with the processor 1510 and stores a variety of information to operate the processor 1510. The transceiver 1530 is operatively coupled with the processor 1510, and transmits and/or receives a radio signal.

Figure 16:
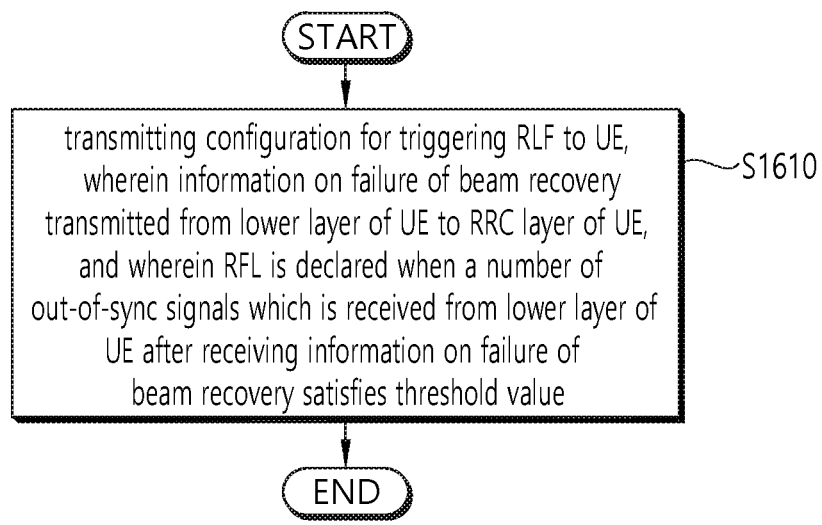
FIG. 16 shows a method for supporting to declare RLF by a BS according to an embodiment of the present invention.

FIG. 16 shows a method for supporting to declare RLF by a BS according to an embodiment of the present invention. The present invention described above for BS side may be applied to this embodiment.

Referring to FIG. 16, in step S1610, the BS may transmit configuration for triggering a radio link failure (RLF) to a user equipment (UE). After then, information on failure of beam recovery may be transmitted from a lower layer of the UE to a radio resource control (RRC) layer of the UE, and the RFL may be declared when a number of out-of-sync (OOS) signals which is received from the lower layer of the UE after receiving the information on failure of beam recovery satisfies a threshold value. The RLF may be declared when the number of OOS signals which is received before receiving the information on failure of beam recovery satisfies the threshold value. The RLF may be not declared when the number of OOS signals does not satisfies the threshold value.

When the UE starts a timer, the RLF may be declared when the number of OOS signals satisfies the threshold value while the timer is running. When the UE starts a timer, the RLF may be declared when information on success of beam recovery is not received from the lower layer of the UE while the timer is running.

The RLF may be declared when a RLF related timer is running upon receiving the information on failure of beam recovery.

The RLF may be declared when the number of IS signals which is received after receiving the information on failure of beam recovery does not satisfies the threshold value. The RLF may be declared when the number of IS signals which is received before receiving the information on failure of beam recovery does not satisfies the threshold value. When the UE starts a timer, the RLF may be declared when the number of IS signals does not satisfies the threshold value while the timer is running.

Figure 17:
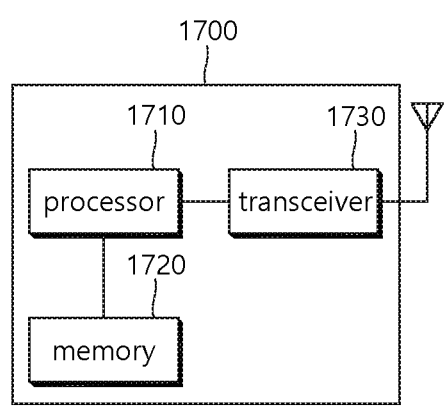
FIG. 17 shows a BS to implement an embodiment of the present invention.

FIG. 17 shows a BS to implement an embodiment of the present invention. The present invention described above for BS side may be applied to this embodiment.

A BS 1700 includes a processor 1710, a memory 1720 and a transceiver 1730. The processor 1710 may be configured to implement proposed functions, procedures and/or methods described in this description. Layers of the radio interface protocol may be implemented in the processor 1710.

Specifically, the processor 1710 may control the transceiver 1730 to transmit configuration for triggering a radio link failure (RLF) to a user equipment (UE). After then, information on failure of beam recovery may be transmitted from a lower layer of the UE to a radio resource control (RRC) layer of the UE, and the RFL may be declared when a number of out-of-sync (OOS) signals which is received from the lower layer of the UE after receiving the information on failure of beam recovery satisfies a threshold value. The RLF may be declared when the number of OOS signals which is received before receiving the information on failure of beam recovery satisfies the threshold value. The RLF may be not declared when the number of OOS signals does not satisfies the threshold value.

The memory 1720 is operatively coupled with the processor 1710 and stores a variety of information to operate the processor 1710. The transceiver 1730 is operatively coupled with the processor 1710, and transmits and/or receives a radio signal.

The processor 1510, 1710 may include an application-specific integrated circuit (ASIC), a separate chipset, a logic circuit, and/or a data processing unit. The memory 1520, 1720 may include a read-only memory (ROM), a random access memory (RAM), a flash memory, a memory card, a storage medium, and/or other equivalent storage devices. The transceiver 1530, 1730 may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor 1510, 1710. The memory 1520, 1720 may be located inside or outside the processor 1510, 1710, and may be coupled to the processor 1510, 1710 by using various well-known means.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for declaring a radio link failure (RLF) by a radio resource control (RRC) layer of a user equipment (UE), the method comprising:
   receiving at least one out-of-sync (OOS) signal, from a lower layer of the UE, before receiving information on failure of beam recovery;
   receiving the information on failure of beam recovery, from the lower layer of the UE;
   determining a number of OOS signals received before receiving the information on failure of beam recovery; and
   based on the number of OOS signals being larger than or equal to a first threshold value, declaring the RLF upon receiving the information on failure of beam recovery,
   wherein, based on the number of OOS signals being less than the first threshold value, the RLF is not declared upon receiving the information on failure of beam recovery.

2. The method of claim 1, wherein the number of OOS signals is counted during a time period before receiving the information on failure of beam recovery.

3. The method of claim 1, further comprising:
   receiving at least one in-sync (IS) signal, from the lower layer of the UE, before receiving the information on failure of beam recovery.

4. The method of claim 3, further comprising:
   determining that a number of IS signals received before receiving the information on failure of beam recovery; and
   based on the number of IS signals being less than a second threshold value, declaring the RLF upon receiving the information on failure of beam recovery,
   wherein, based on the number of IS signals being larger than or equal to the second threshold value, the RLF is not declared upon receiving the information on failure of beam recovery.

5. The method of claim 4, wherein the number of IS signals is counted during a time period before receiving the information on failure of beam recovery.

6. The method of claim 1, further comprising:
   receiving configuration for triggering the RLF from a base station (BS).

7. A user equipment (UE) comprising a radio resource control (RRC) layer configured to declare a radio link failure (RLF), the UE comprising:
   a memory; a transceiver; and
   a processor connected with the memory and the transceiver, and configured to:
   receive at least one out-of-sync (OOS) signal, from a lower layer of the UE, before receiving information on failure of beam recovery;

receive the information on failure of beam recovery, from the lower layer of the UE;

determine a number of OOS signals received before receiving the information on failure of beam recovery; and based on the number of OOS signals being larger than or equal to a first threshold value, declare the RLF upon receiving the information on failure of beam recovery, wherein, based on the number of OOS signals being less than the first threshold value, the RLF is not declared upon receiving the information on failure of beam recovery.

8. The method of claim 1, wherein the UE communicates with at least one of a mobile terminal, a network or autonomous vehicles other than the UE.

* * * * *